(12) United States Patent
Dinsmore

(10) Patent No.: US 7,124,466 B2
(45) Date of Patent: Oct. 24, 2006

(54) PARTICLE CAPTURE SYSTEM

(75) Inventor: Michael P. Dinsmore, Berthoud, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 483 days.

(21) Appl. No.: 10/183,815

(22) Filed: Jun. 25, 2002

(65) Prior Publication Data

US 2003/0145414 A1 Aug. 7, 2003

Related U.S. Application Data

(60) Provisional application No. 60/355,669, filed on Feb. 5, 2002.

(51) Int. Cl.
A47L 7/00 (2006.01)
A47L 15/00 (2006.01)

(52) U.S. Cl. .................... 15/302; 134/153; 134/200

(58) Field of Classification Search .......... 15/300.1, 15/301, 302, 303; 134/110, 111, 153, 200
See application file for complete search history.

(56) References Cited

U.S. PATENT DOCUMENTS

| | | | | |
|---|---|---|---|---|
| 2,501,887 A | * | 3/1950 | Cress | 134/148 |
| 2,562,076 A | * | 7/1951 | Weisselberg | 134/139 |
| 3,607,369 A | | 9/1971 | Batta | 117/119 |
| 3,889,289 A | | 6/1975 | Kubach | 360/6 |
| 3,911,183 A | | 10/1975 | Hinkes | 428/15 |
| 3,922,439 A | | 11/1975 | Hartmann et al. | 428/425 |
| 3,975,195 A | | 8/1976 | Goffe | 96/1 PS |
| 3,993,484 A | | 11/1976 | Rait et al. | 96/1.4 |
| 4,025,363 A | * | 5/1977 | De Santis | 134/102.2 |
| 4,056,654 A | | 11/1977 | Kompanek | 428/409 |
| 4,096,079 A | | 6/1978 | Pardee | 252/51.5 R |
| 4,096,949 A | | 6/1978 | Hoover et al. | 209/74 M |
| 4,128,672 A | | 12/1978 | Wunsch et al. | 427/130 |
| 4,132,567 A | * | 1/1979 | Blackwood | 134/1 |
| 4,152,484 A | | 5/1979 | Bachmann et al. | 428/425 |
| 4,154,895 A | | 5/1979 | Ogawa et al. | 428/425 |
| 4,212,702 A | | 7/1980 | Mizuguchi et al. | 162/36 |
| 4,343,641 A | | 8/1982 | Scholes | 65/60.2 |
| 4,363,711 A | | 12/1982 | Kuehnle | 204/192 P |
| 4,376,171 A | | 3/1983 | Blount | 521/100 |
| 4,404,238 A | | 9/1983 | Baldwin | 427/128 |
| 4,405,684 A | | 9/1983 | Blumentritt et al. | 428/336 |
| 4,450,199 A | | 5/1984 | Tadokoro et al. | 428/317.9 |
| 4,471,016 A | | 9/1984 | Scholes | 428/201 |
| 4,472,455 A | | 9/1984 | Kohl et al. | 427/48 |
| 4,484,184 A | | 11/1984 | Gregor et al. | 340/572 |
| 4,495,487 A | | 1/1985 | Kavesh et al. | 340/572 |
| 4,497,007 A | | 1/1985 | Greiner et al. | 360/114 |
| 4,532,564 A | | 7/1985 | Larson et al. | 360/97 |
| 4,535,373 A | | 8/1985 | Schuh | 360/97 |
| 4,555,443 A | | 11/1985 | Kikugawa et al. | 428/336 |
| 4,567,108 A | | 1/1986 | Lehner et al. | 428/425.9 |
| 4,596,739 A | | 6/1986 | Piltingsrud et al. | 428/315.9 |

(Continued)

Primary Examiner—Terrence R. Till
(74) Attorney, Agent, or Firm—Shumaker & Sieffert PA

(57) ABSTRACT

A particle capture system includes a container sized to receive a structural disc drive component. A fixture is able to maintain the disc drive component within a spray zone in the container, and a first nozzle in the container is connected to a fluid source and is oriented to direct fluid at the spray zone. A particle trap is connected to a fluid outlet of the container and is able to trap particles from fluid exiting the container through the fluid outlet.

20 Claims, 5 Drawing Sheets

U.S. PATENT DOCUMENTS

| | | |
|---|---|---|
| 4,597,990 A | 7/1986 | Roller et al. ................. 427/130 |
| 4,626,336 A | 12/1986 | Bloomquist et al. ......... 204/298 |
| 4,652,496 A | 3/1987 | Yasufuku et al. ......... 428/425.9 |
| 4,661,729 A | 4/1987 | Hames et al. .................. 310/13 |
| 4,663,009 A | 5/1987 | Bloomquist et al. ...... 204/192.2 |
| 4,669,004 A | 5/1987 | Moon et al. ................... 360/77 |
| 4,684,572 A | 8/1987 | Yasufuku et al. ............ 428/323 |
| 4,685,415 A | 8/1987 | Wegner ........................ 118/58 |
| 4,687,704 A | 8/1987 | Miyoshi et al. ............. 428/328 |
| 4,700,246 A | 10/1987 | Luoma et al. ................. 360/98 |
| 4,710,427 A | 12/1987 | Yamauchi et al. ........... 428/407 |
| 4,713,293 A | 12/1987 | Asano et al. ................. 428/403 |
| 4,737,173 A | 4/1988 | Kudirka et al. ................ 55/276 |
| 4,743,500 A | 5/1988 | Miyoshi et al. ............. 428/323 |
| 4,767,657 A | 8/1988 | Sakamoto et al. ........... 428/143 |
| 4,783,705 A | 11/1988 | Moon et al. ................... 360/77 |
| 4,790,921 A | 12/1988 | Bloomquist et al. ... 204/192.12 |
| 4,791,168 A | 12/1988 | Salatin et al. ................ 524/601 |
| 4,801,505 A | 1/1989 | Ejiri et al. .................... 428/404 |
| 4,818,606 A | 4/1989 | Koyama et al. ............. 428/323 |
| 5,174,317 A * | 12/1992 | Robb et al. .............. 134/166 C |
| RE34,730 E | 9/1994 | Salatin et al. ............. 427/407.1 |
| 5,398,708 A * | 3/1995 | Sheldon ........................ 134/86 |
| 5,482,064 A * | 1/1996 | Goddard ................... 134/57 R |
| 5,562,114 A * | 10/1996 | St. Martin ................... 134/111 |
| 5,932,013 A * | 8/1999 | Salli et al. ................... 118/715 |
| 6,032,683 A * | 3/2000 | Casey et al. ................ 134/199 |
| 6,041,797 A * | 3/2000 | Casselman ................... 134/152 |
| 6,585,943 B1 * | 7/2003 | Sanford et al. ............. 422/307 |
| 6,746,543 B1 * | 6/2004 | Kamikawa et al. ........... 134/26 |

\* cited by examiner

PARTICLE CAPTURE SYSTEM

RELATED APPLICATIONS

This application claims priority of U.S. provisional application Ser. No. 60/355,669, filed Feb. 5, 2002.

FIELD OF THE INVENTION

This application relates generally to capturing particles and more particularly to a particle capture system for capturing particles from components within a sealed environment, such as internal disc drive components.

BACKGROUND OF THE INVENTION

A typical disc drive includes a base to which various structural components of the disc drive are mounted. A top cover cooperates with the base to form an internal, sealed environment for the disc drive. The components include a spindle motor, which rotates one or more discs at a high speed. Information is written to and read from tracks on the discs through the use of an actuator assembly, which rotates during a seek operation about a bearing shaft assembly positioned adjacent the discs. The actuator assembly includes at least one actuator arm, which extends towards the discs, with one or more flexures extending from each of the actuator arms. Mounted at the distal end of each of the flexures is a head, which includes an air bearing slider enabling the head to fly in close proximity adjacent the corresponding surface of the associated disc.

Free particles in the disc drive have an adverse affect on drive reliability. In fact, particles are currently believed to be the leading cause of failure in disc drives. Hard particles (e.g., aluminum oxide, silicone oxide, silicon carbide, titanium carbide, titanium nitride, and tungsten carbide) may be dislodged from components within a disc drive by handling, startup, operation and shut down. These particles are transported throughout the drive via air currents produced by the spinning discs within the drive. Of particular concern are hard airborne particles that enter the head-disc interface. These particles can scratch the disc surface or become embedded in the disc, leading to catastrophic failures and/or irrecoverable data loss. Additionally, particles under the slider can damage the sensitive head transducer and possibly prevent any further read/write operations of the disc drive.

Presently, disc drive component vendors and disc drive manufacturers use sonication to analyze the particles that may be dislodged from a disc drive component for purposes of quality control and design. However, it is believed that sonication can break down the material of the tested component and dislodge particles that would not be dislodged in a normal disc drive environment. Thus, it is thought that sonication produces unrealistic data and that it may hide the presence of particles that have smaller concentrations but a larger impact on disc drive failure.

Additionally, sonication requires undue handling of the tested component. More specifically, a user must put the part on a holder; lower the holder into a beaker that contains water; lower the beaker into an open bath; apply ultrasonic waves to the bath; remove the beaker from the bath; remove the component from the beaker; pour the beaker contents into a funnel that is connected to a vacuum source; and spray the funnel to wash down any remaining particles.

Accordingly there is a need for a system that requires little handling to capture particles from disc drive components and that avoids dislodging particles that would not be dislodged in a disc drive environment. The present invention provides a solution to this and other problems, and offers other advantages over the prior art.

SUMMARY OF THE INVENTION

Against this backdrop the present invention has been developed. A particle capture system in accordance with an embodiment of the present invention includes a container sized to receive a structural disc drive component. A fixture is able to maintain the disc drive component within a spray zone in the container, and a first nozzle in the container is connected to a fluid source and is oriented to direct fluid at the spray zone. A particle trap is connected to a fluid outlet of the container and is able to trap particles from fluid exiting the container through the fluid outlet.

Stated another way, a particle capture system according to an embodiment of the present invention includes a container with a fluid outlet. A fixture is able to maintain a component within a spray zone inside the container. A fluid source is connected to a first nozzle that is attached to the container and oriented to direct fluid toward the spray zone. Thus, fluid enters the container through the nozzle and exits the container through the fluid outlet. A vacuum source is connected to the fluid outlet, and a filter connected to the fluid outlet is able to trap particles carried by the fluid exiting the container through the fluid outlet.

These and various other features as well as advantages which characterize the present invention will be apparent from a reading of the following detailed description and a review of the associated drawings.

DETAILED DESCRIPTION

Figure 1:
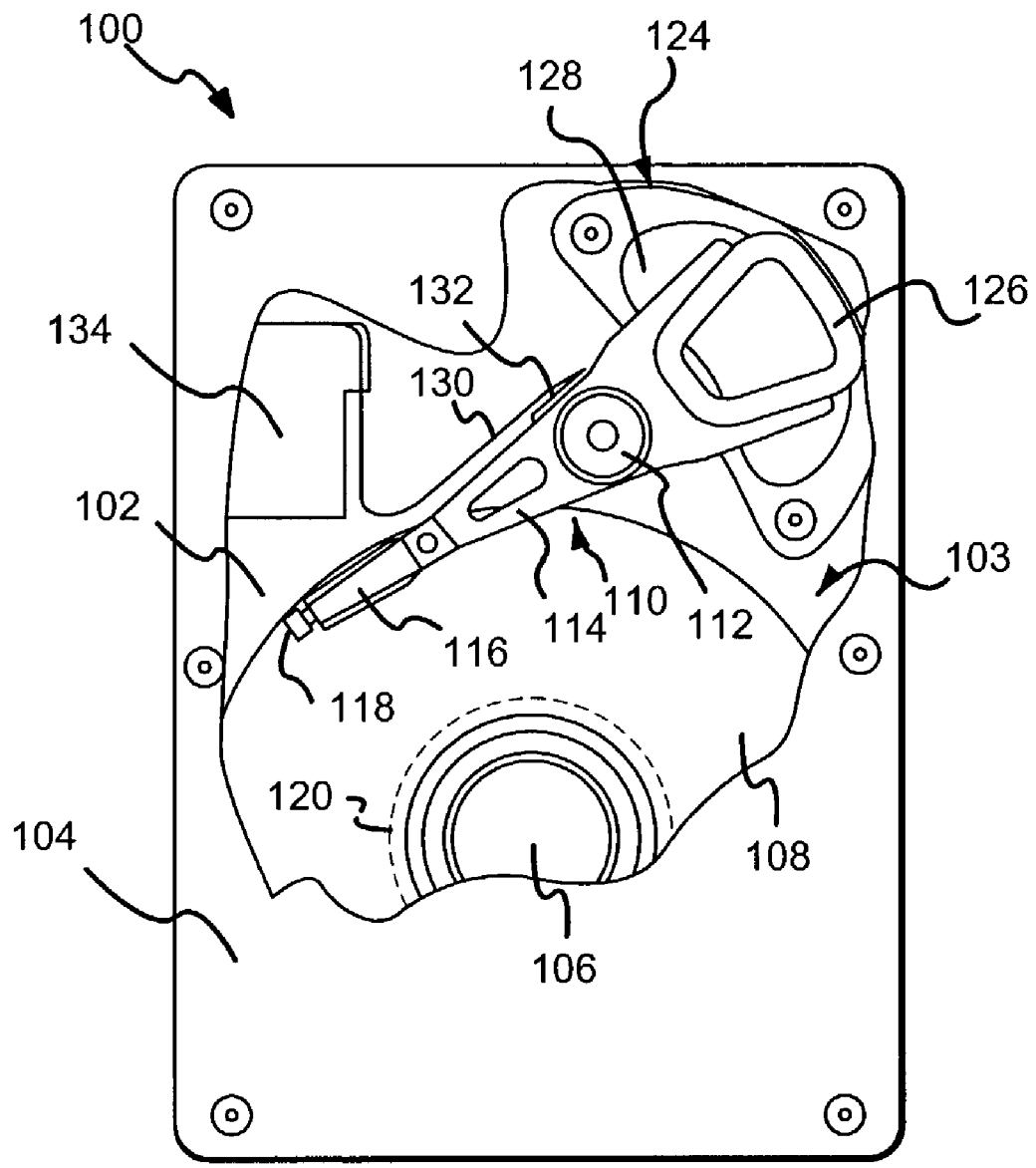
FIG. 1 is a plan view of a disc drive showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
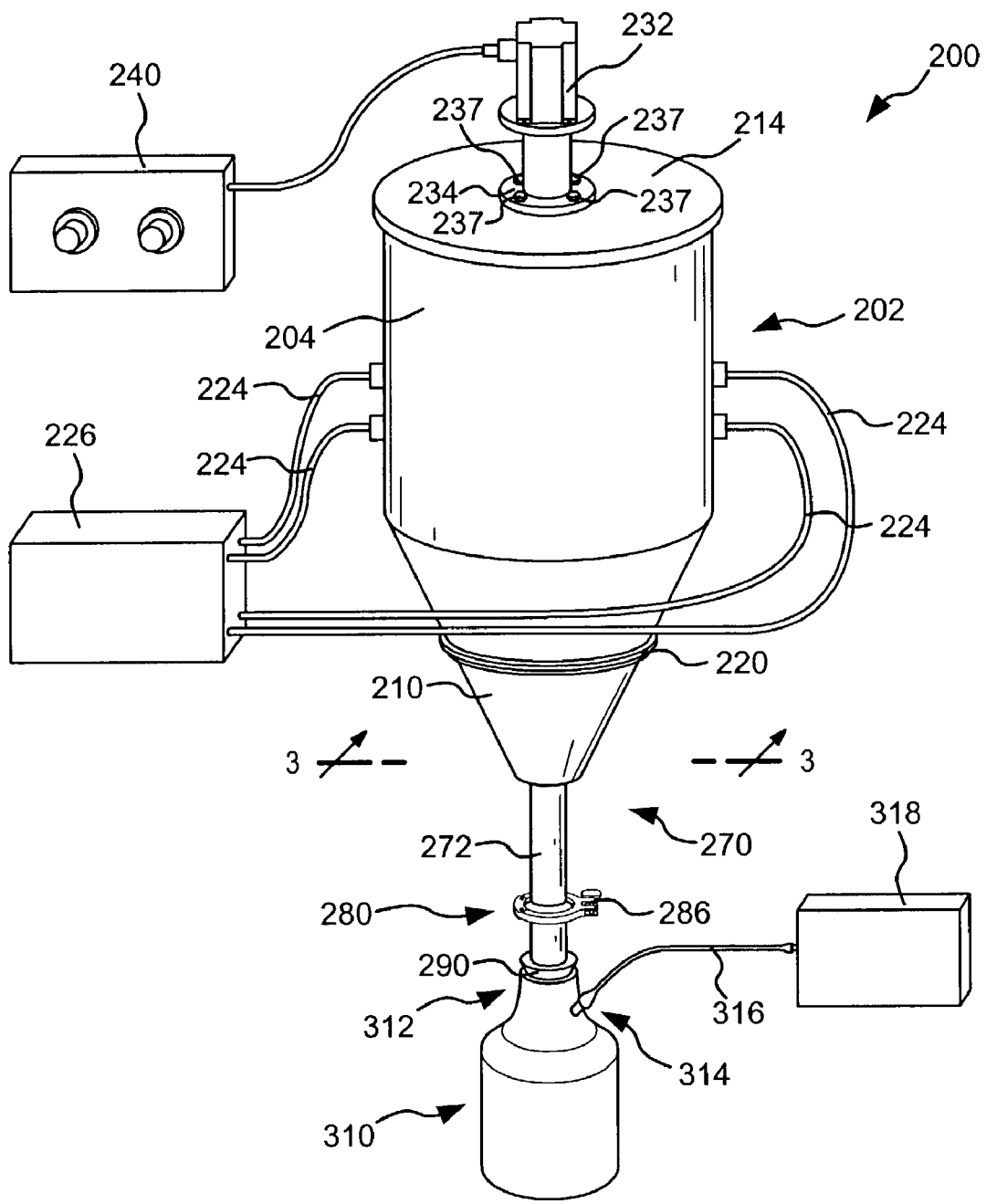
FIG. 2 is a perspective view of a component particle capture system in accordance with a preferred embodiment of the present invention.
Figure 3:
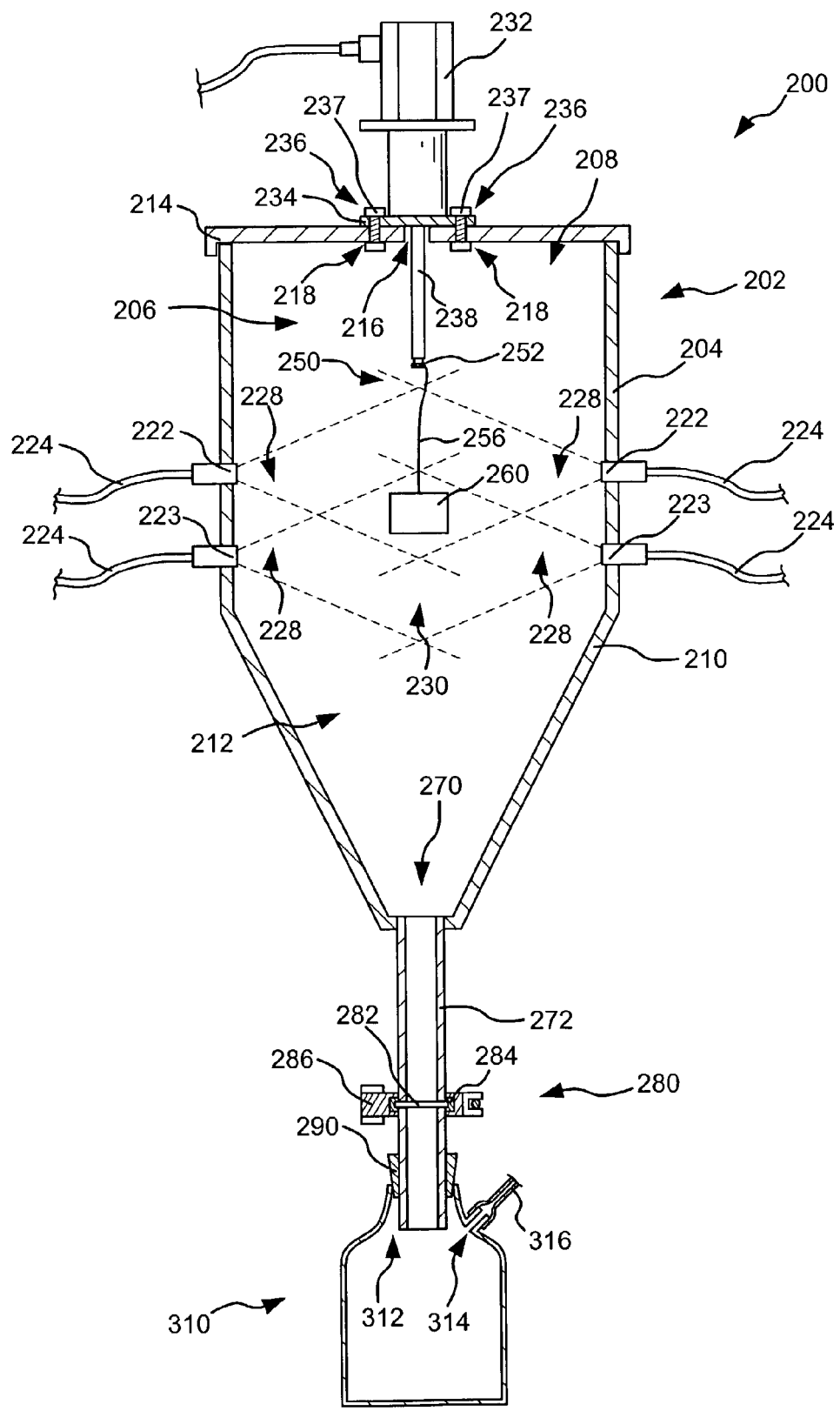
FIG. 3 is a front sectional view taken along line 3—3 of FIG. 2.
Figure 4:
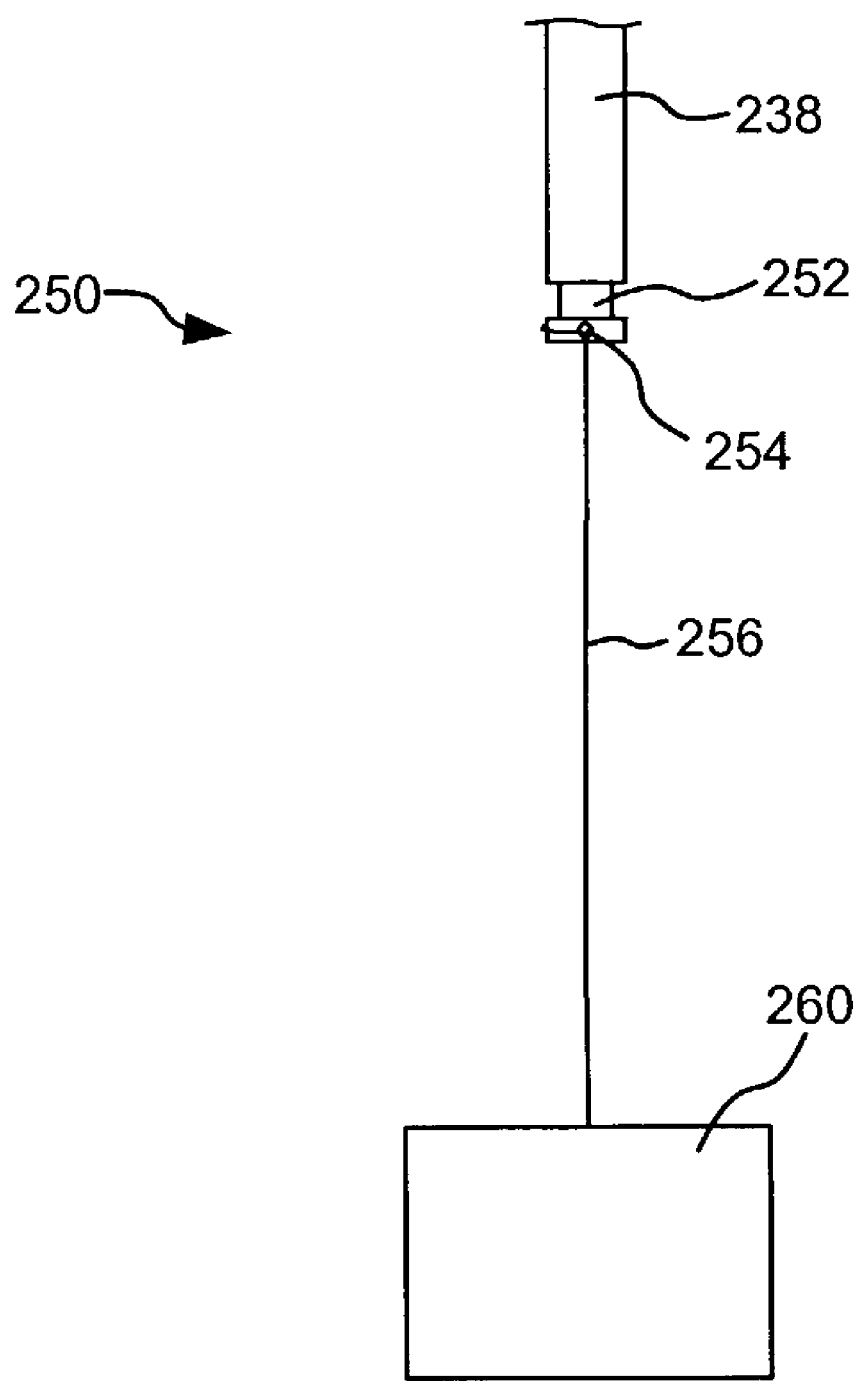
FIG. 4 is a broken-away side view of the fixture of the component particle capture system of FIG. 3.

The disc drive component particle capture system 200 shown in FIGS. 2–4 can be used to capture particles that may be dislodged from the structural components of the disc drive 100 during normal use. The number and identity of those particles can then be determined. As used herein, a disc drive component may be a unitary disc drive component, an assembly or sub-assembly of components, or even an entire disc drive 100.

The system 200 includes a component container 202. The component container 202 includes a substantially cylindrical wall 204 that defines a cylindrical space 206 and an upwardly-facing opening 208. A substantially frustroconical wall 210 slopes inwardly and downwardly from the cylindrical wall 204 to define a frustroconical space 212. The component container 202 could be many different shapes, although it preferably includes an inwardly-sloped funnel portion, such as the frustroconical wall 210. A circular lid 214 rests on the top of the cylindrical wall 204 and spans the opening 208. The lid 214 defines a centrally located circular shaft hole 216 and mounting holes 218 spaced circumferentially about the shaft hole 216. The shaft hole 216 and the mounting holes 218 preferably extend through the lid 214.

A support ring 220 receives the frustroconical wall 210 and supports the component container 202. A pair of upper nozzles 222 and a pair of lower nozzles 223 are supported by the cylindrical wall 204. More specifically, the upper nozzles 222 are on opposing sides of the cylindrical wall 204 at the same height and are directed inwardly to the center of the cylindrical space 206. The lower nozzles 223 are also on opposing sides of the cylindrical wall 204 directly below the upper nozzles 222 and are also directed inwardly to the center of the cylindrical space 206. Fluid source lines 224 connect the nozzles 222 and 223 to a fluid source 226. The fluid source 226 may be a source of liquid or gas. The pressure and flow rate of the fluid provided by the fluid source 226 is preferably adjustable, such as by a digitally controlled flow meter. The flow rate and the time of flow should be adjusted depending on the characteristics of the component to be tested, including the material and the geometry of the component.

Each nozzle 222 and 223 preferably defines an individual spray zone 228, which is the path of the liquid or gas exiting the respective nozzle 222 or 223. Each spray zone 228 preferably expands from the nozzle at an angle of from about 45 to about 90 degrees. The spray zones 228 of the four nozzles 222 and 223 preferably overlap and define a combined spray zone 230 that is centrally located within the component container 202. Notably, many different nozzle and spray zone configurations are possible within the scope of the present invention. However, each configuration is preferably symmetrical so that the fluid from the nozzles will not cause erratic movement of a disc drive component within the component container 202.

A motor 232 includes a housing having an annular flange 234 that abuts the top of the lid 214. The flange 234 defines circumferentially-spaced mounting holes 236 that align with the mounting holes 218 of the lid 214. Fasteners 237, such as nuts and bolts, extend through the motor mounting holes 236 and the lid mounting holes 218 to fix the motor 232 to the lid 214. A drive shaft 238 depends from the motor 232 and through the shaft hole 216 of the lid 214. A power source and motor control 240 provides power to the motor 232 and also controls the operation of the motor 232, including the speed at which the motor rotates the drive shaft 238.

A fixture 250, which is seen best in FIG. 4, includes a fixture screw 252 that engages threads in a downwardly-opening hole (not shown) of the drive shaft 238. A radial fixture hole 254 extends through the fixture screw 252 and receives a cord 256, which extends through the fixture hole 254 and about the fixture screw 252. The cord 256 is preferably made of a clean material that will not contribute significant contaminants into the component container 202. In a preferred embodiment, the cord 256 is commercially available fishing line. The cord 256 depends from the screw 252 and is attached to a disc drive component 260, such as by being tied to the component 260. The cord 256 thus supports the disc drive component 260 within the container 202, preferably at about the center of the combined spray zone 230.

The lower truncated portion of the frustroconical wall 210 defines an outlet or drain 270 from the component container 202. The outlet 270 includes a conduit 272, such as a pipe, that depends from the frustroconical wall 210. A particle trap 280 is attached to the conduit 272 below the container 202. The particle trap 280 preferably includes a filter 282 and an insert 284 holding the filter in place. The particle trap 280 also includes a circular filter clamp 286 that is attached to the conduit 272 and holds the insert 284 in place. The size of the insert 284 is preferably matched to the size of the filter 282 used for a particular application. Thus, many different sizes of filters can be interchangeably used with the system 200. The filter 282 preferably has a filter area that is as small as possible. However, if the filter area is too small, the density of particles in the filter will be so great that a scanning electron microscope will not be able to distinguish one particle from another. In a preferred embodiment, the filter is a 0.2 micron filter with a filter area of about 250 square millimeters. While such a filter particle trap is preferred, any particle trap that can trap particles of interest from fluid flowing through the conduit 272 can be used.

An elastomeric stopper 290 is secured about the conduit 272 below the particle trap 280. A waste container 310 defines an upwardly opening inlet 312 that receives the lower end of the conduit 272 and the stopper 290. The stopper 290 abuts the rim of the inlet 312 to create a seal between the waste container 310 and the conduit 272. The waste container 310 also defines a vacuum outlet 314 located adjacent the inlet 312. The vacuum outlet 314 is connected to a vacuum line 316 that extends to a vacuum source 318. The vacuum source 318 is preferably a standard laboratory vacuum pump that is able to pull a vacuum of from about 21 to about 23 inches of mercury.

The parts of the system 200 that may be exposed to fluid are preferably made of materials other than those that are being detected. Additionally, the parts of the system 200 are preferably polished to reduce the number of particles that may be dislodged during use of the system 200. In a preferred embodiment of the present invention, the cylindrical wall 204 and the frustroconical wall 210 form a unitary stainless steel spun part that is polished. Preferably, the drive shaft 238, the lid 214, the nozzles 222 and 223, and the conduit 272 are all polished stainless steel. The waste container 310 is preferably made of glass, and the vacuum lines are made of standard vacuum tubing that is able to withstand a 23 inches of mercury vacuum. Various components are preferably welded together, such as with aerospace welds or other types of welds that produce a minimum number of particles in the system 200. For example, the component container 202 and the filter clamp 286 are preferably welded to the conduit 272 with aerospace welds. Additionally, a material such as the material sold under the trademark TEFLON by E. I. du Pont de Nemours and Company of Wilmington, Delaware may be used to aid in sealing the various components of the system 200. The fluid source lines 224 are preferably also made of TEFLON material.

Figure 5:
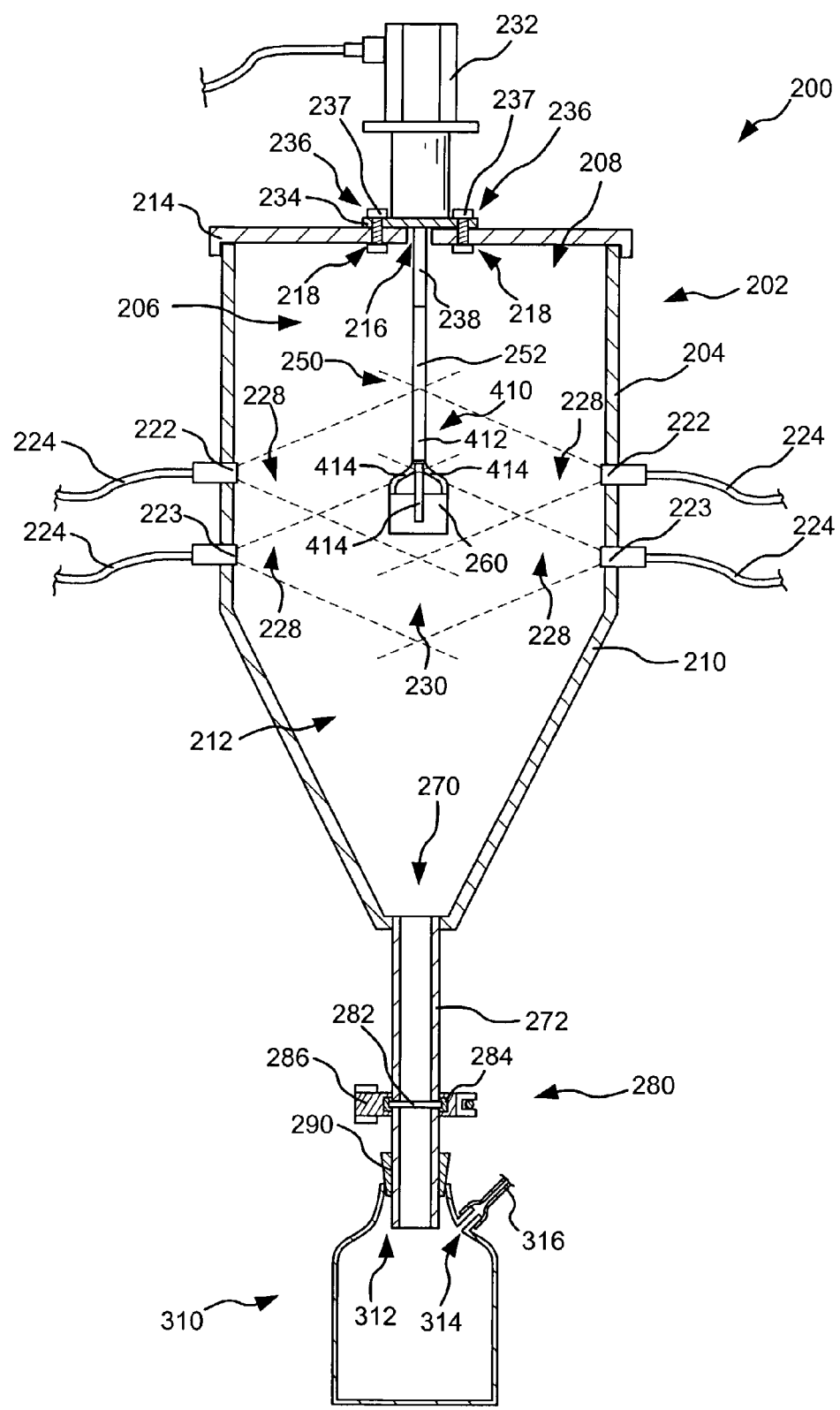
FIG. 5 is a front sectional view similar to FIG. 3, but showing an alternative embodiment of the fixture of the component particle capture system.

An alternative embodiment of the system 200 will now be described with reference to FIG. 5. Reference numbers of FIG. 5 are the same as with FIGS. 2–4, except for parts that differ in the alternative embodiment of FIG. 5. The alternative embodiment is the same as the embodiment of FIGS. 2–4 except that the fixture 250 includes a clamp 410 in place of the fixture screw 252 and the fixture cord 256. The clamp 410 includes a clamp rod 412 that includes a male threaded portion (not shown) that engages the female threaded hole (not shown) of the drive shaft 238 described above. Clamp arms 414 are attached to the lower end of the of the clamp rod 412. The clamp arms 414 pivot to engage the disc drive component 260 and hold it within the combined spray zone 230. The clamp 410 preferably includes three clamp arms 414, although different clamping configurations could be used. The clamp rod 412 and the clamp arms 414 are preferably made of polished stainless steel, although other materials could be used.

The use of the system 200 will now be described with reference to FIGS. 2–5. Before testing a component 260, the system 200 is preferably cleaned. This may be done by running the system 200 without a component (i.e., running a "blank"). This is done by merely placing the lid 214 on the container 202, placing a filter 282 in an insert 284 and clamping the insert 284 in place with the filter clamp 286. The waste container 310 is then placed in engagement with the rubber stopper 290 so that the conduit 272 empties into the container 310. The fluid source 226 then provides a fluid, such as water, through the fluid source lines 224. The fluid sprays from the nozzles 222 and 223 and cleans the component container 202. The vacuum source 318 is activated while the fluid sprays from the nozzles 222 and 223. The vacuum source 318 pulls air from the waste container 310 through the vacuum line 316. The resulting low pressure in the waste container 310 pulls air and liquid from the component container 202 through the conduit 272 and through the filter 282 of the particle trap. The filter 282 thus traps particles from the component container 202. The vacuum source 318 continues to run for a period of time after the fluid source 226 quits supplying fluid to the nozzles 222 and 223. The vacuum source 318 thereby dries the filter 282 before the filter 282 is removed. The filter 282 can then be removed from the system 200 and an electron microscope can analyze the filter to determine the number and identity of particles trapped by the filter.

An advantage of the present invention is that the system effectively cleans up by running blanks. Three blanks were run with the system 200 and the 0.2 micron 250 square millimeter filter from each blank run was analyzed in an electron microscope. In the first run two hundred seventy three particles were detected in 26% of the filter area, in the second run two hundred twenty one particles were detected in 38% of the filter area, and in the third run one hundred forty four particles were detected in 49% of the filter area. Thus, the estimated number of particles for the entire filter area (number of particles detected×100/percent filter area analyzed) decreased from one thousand fifty in the first run to five hundred eighty two in the second run and to two hundred ninety four in the third run. Stated another way, the number of total estimated particles in the third run was less than one-third the number of total estimated particles in the first run.

After the system 200 is sufficiently clean, the lid 214 is removed and a component 260 is attached to the fixture 250 either by the cord 256 as shown in FIGS. 3–4 or alternatively by the clamp 410 as shown in FIG. 5. The cord 256 is preferably used if the clamp arms 414 cannot grab the component 260 without dislodging particles either because of the component's geometry or because it is too fragile. The lid 214 is then placed on the container 202 so that the component 260 is held within the container 202 by the fixture 250. A filter 282 is placed in an insert 284, which is then clamped in place with the filter clamp 286 as shown in FIGS. 3 and 5. The waste container 310 is placed in engagement with the rubber stopper 290 so that the conduit 272 empties into the container 310.

The fluid source 226 then provides a fluid, such as air or water, through the fluid source lines 224. Other liquid or gaseous fluids could be used to simulate a disc drive environment. The fluid sprays from the nozzles 222 and 223 and forms a combined spray zone 230. The fluid preferably dislodges particles from the component 260 that would be dislodged in a normal disc drive environment Gaseous fluid may be preferred because it will likely better simulate a disc drive environment and thus only dislodge particles from the component 260 that would be dislodged in a normal disc drive environment. The motor 232 preferable rotates the fixture 250 and thus the component 260 while the fluid sprays from the nozzles 222 and 223 to assure that the fluid sprays evenly over the exposed surfaces of the component 260. As shown in FIG. 3 and FIG. 5, the component 260 may remain in the combined spray zone 230 when rotated by the motor 232.

If the sprayed fluid is gaseous, then after the gaseous fluid spray is complete, the lid 214 and the attached component 260 are removed from the component container 202. The lid 214 is replaced with a solid lid (not shown) without a shaft hole and without an attached motor or fixture. The fluid source 226 or a different fluid source then supplies a liquid fluid through the nozzles 222 and 223. The liquid fluid washes remaining particles from the component container 202 and the upper portion of the conduit 272 so that the filter 282 can trap the particles.

The vacuum source 318 is activated when the fluid begins spraying from the nozzles 222 and 223. The vacuum source 318 pulls air from the waste container 310 through the vacuum line 316. The resulting low pressure in the waste container 310 pulls gas and/or liquid from the component container 202, through the conduit 272, and through the filter 282 of the particle trap 280. The filter 282 thus traps particles from the component container 202. The vacuum source 318 continues to run for a period of time after the fluid source 226 quits supplying fluid to the nozzles 222 and 223. The vacuum source 318 thereby dries the filter 282 before the filter 282 is removed. The filter 282 is then removed from the system 200 and an electron microscope analyzes the filter in a conventional manner to determine the number and identity of particles trapped by the filter 282.

The system 200 thus requires fewer handling steps than prior sonication systems. Additionally, the system 200 defines a closed environment if the lid 214 is included, while prior sonication methods included open beakers. Such a closed environment minimizes the number of stray particles that enter the system 200 during a test. Additionally, it is believed that the system 200 represents a disc drive environment more closely than prior sonication systems. Finally, the system 200 produces results that are more consistent than results achieved by prior sonication systems, thus indicating that the system 200 is more accurate than prior sonication systems.

A particle capture system (such as 200) in accordance with an embodiment of the present invention may be summarized as including a container (such as 202) sized to receive a structural disc drive component (such as 260). A fixture (such as 250) is able to maintain the disc drive component within a spray zone (such as 230) in the container, and a first nozzle (such as 222 or 223) in the container is connected to a fluid source (such as 226) and is oriented to direct fluid at the spray zone. A particle trap (such as 280) is connected to a fluid outlet (such as 270) of the container and is able to trap particles from fluid exiting the container through the fluid outlet.

The particle trap preferably includes a filter (such as 282). Also, the container is preferably closed. The closed container preferably defines an upwardly-facing opening (such as 208) and includes a lid (such as 214) spanning the opening.

The fixture may include a cord (such as 256) that is able to suspend the disc drive component within the spray zone. Alternatively, the fixture may include a clamp (such as 410) that is able to hold the disc drive component within the spray zone. Additionally, the system preferably includes an actuator (such as 232) connected to the fixture that is able to rotate the disc drive component within the spray zone.

The system preferably also includes a vacuum source (such as 318) connected to the fluid outlet and a second nozzle (such as 222 or 223) located on an opposite side of the spray zone from the first nozzle. The system may also include a clamp (such as 286) securing the particle trap to the fluid outlet, and the particle trap might include a removable insert (such as 284) holding a filter within the clamp. The fluid source may be a liquid source or a gas source.

Stated another way, a particle capture system (such as 200) according to an embodiment of the present invention may be summarized as including a container (such as 202) with a fluid outlet (such as 270). A fixture (such as 250) is able to maintain a component within a spray zone (such as 230) inside the container. A fluid source is connected to a first nozzle (such as 222 or 223) that is attached to the container and oriented to direct fluid toward the spray zone. Thus, fluid enters the container through the nozzle and exits the container through the fluid outlet. A vacuum source (such as 318) is connected to the fluid outlet (such as 270), and a filter (such as 282) connected to the fluid outlet is able to trap particles carried by the fluid exiting the container through the fluid outlet. The container may include a funnel portion (such as 210) opposite the opening that empties into the fluid outlet.

Stated yet another way, a particle capture system (such as 200) according to an embodiment of the present invention may alternatively be summarized as a container (such as 202) sized to receive a component (such as 260) therein. The container includes a fluid outlet (such as 270) and means for spraying a fluid at the disc drive component (such as 260) within the container and for trapping particles from the fluid as the fluid exits the container through the fluid outlet.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, many different shapes and materials can be used for the parts of the system 200, including the container 202. Numerous other changes may be made which will readily suggest themselves to those skilled in the art and which are encompassed in the spirit of the invention disclosed and as defined in the appended claims.

What is claimed is:

1. A particle capture system, comprising:
   a container sized to receive a component, the container including a fluid outlet, and wherein the container defines an upwardly-facing opening;
   a fixture operable to maintain the component within a spray zone in the container;
   a first nozzle in the container oriented to direct fluid at the spray zone;
   a fluid source connected to the nozzle;
   a particle trap connected to the fluid outlet operable to trap particles from fluid exiting the container through the fluid outlet; and
   a vacuum source connected to the fluid outlet.

2. The system of claim 1, wherein the particle trap comprises a filter.

3. The system of claim 2, wherein the filter has a filter area of about 250 square millimeters.

4. The system of claim 1, wherein the container is a closed container.

5. The system of claim 1, wherein the fixture comprises a cord operable to suspend the component within the spray zone.

6. The system of claim 1, wherein the fixture comprises a clamp operable to hold the component within the spray zone.

7. The system of claim 1, further comprising an actuator connected to the fixture operable to rotate the component within the spray zone.

8. The system of claim 1, further comprising a second nozzle, wherein the first nozzle and the second nozzle are located on opposite sides of the spray zone.

9. The system of claim 1, further comprising a clamp securing the particle trap to the fluid outlet.

10. The system of claim 9, wherein the particle trap further comprises a removable insert within the clamp, the insert holding or receiving a filter.

11. The system of claim 1, wherein the fluid source is a liquid source.

12. The system of claim 1, wherein the fluid source is a gas source.

13. The system of claim 1, further comprising a lid spanning the opening.

14. The system of claim 1, further comprising a lid spanning and sealing the opening.

15. The system of claim 1, wherein the component is a disc drive component.

16. A particle capture system, comprising:
 a container sized to receive a component, the container including a fluid outlet, and wherein the container defines an upwardly-facing opening;
 a fixture operable to maintain the component within a spray zone in the container;
 an actuator connected to the fixture operable to rotate the component within the spray zone;
 a first nozzle in the container oriented to direct fluid at the spray zone;
 a fluid source connected to the nozzle;
 a particle trap connected to the fluid outlet operable to trap particles from fluid exiting the container through the fluid outlet; and
 a clamp securing the particle trap to the fluid outlet, wherein the particle trap further comprises a removable insert within the clamp, the insert holding or receiving a filter.

17. The system of claim 16, wherein the particle trap comprises a filter.

18. The system of claim 16, further comprising a second nozzle, wherein the first nozzle and the second nozzle are located on opposite sides of the spray zone.

19. The system of claim 16, wherein the actuator comprises:
 a motor; and
 a drive shaft.

20. The system of claim 16, wherein the component remains in the spray zone when rotated by the actuator.

* * * * *

UNITED STATES PATENT AND TRADEMARK OFFICE
CERTIFICATE OF CORRECTION

| | |
|---|---|
| PATENT NO. | : 7,124,466 B2 |
| APPLICATION NO. | : 10/183815 |
| DATED | : October 24, 2006 |
| INVENTOR(S) | : Michael P. Dinsmore |

It is certified that error appears in the above-identified patent and that said Letters Patent is hereby corrected as shown below:

Col. 6, Line 54, "the drive environment Gaseous fluid" should be --the drive environment. Gaseous fluid--

Col. 6, Line 58, "The motor 232 preferable rotates the" should be --The motor 232 preferably rotates the--

Signed and Sealed this

Twenty-seventh Day of May, 2008

JON W. DUDAS
*Director of the United States Patent and Trademark Office*